(12) United States Patent
Langos et al.

(10) Patent No.: US 6,551,089 B1
(45) Date of Patent: Apr. 22, 2003

(54) EXTRUSION HEAD WITH SPIRAL-CHANNEL DISTRIBUTOR ELEMENT

(76) Inventors: Peter Langos, Im Wehrfeld 22, 53757 St. Augustin (DE); Manfred Lehmann, Rosenhügel 80, 51143 Köln (DE); Stefan Keusch, Hubertusstrasse 11, 50321 Brühl (DE)

( * ) Notice: Subject to any disclaimer, the term of this patent is extended or adjusted under 35 U.S.C. 154(b) by 0 days.

(21) Appl. No.: 09/719,649
(22) PCT Filed: Apr. 14, 2000
(86) PCT No.: PCT/EP00/03365
§ 371 (c)(1), (2), (4) Date: Jun. 17, 2001
(87) PCT Pub. No.: WO00/63000
PCT Pub. Date: Oct. 26, 2000

(30) Foreign Application Priority Data

Apr. 16, 1999 (DE) ..................... 299 06 763 U

(51) Int. Cl.[7] .............................................. B29C 47/06
(52) U.S. Cl. ...................... 425/133.1; 425/381; 425/462
(58) Field of Search .............................. 425/133.1, 381, 425/462

(56) References Cited

U.S. PATENT DOCUMENTS

| 3,023,461 A | 3/1962 | Sherman ..................... 264/515 |
| 4,038,017 A | 7/1977 | Langecker .................. 425/466 |
| 4,182,603 A | * 1/1980 | Knittel ..................... 425/133.1 |
| 5,256,051 A | 10/1993 | Langos et al. ............ 425/133.1 |
| 5,262,109 A | * 11/1993 | Cook ...................... 264/171.29 |
| 5,690,972 A | * 11/1997 | Planeta et al. ........... 425/133.1 |

FOREIGN PATENT DOCUMENTS

| DE | 36 23 308 A | 1/1988 |
| DE | 41 17 083 A | 12/1991 |

* cited by examiner

Primary Examiner—Jan H. Silbaugh
Assistant Examiner—Joseph S Del Sole

(57) ABSTRACT

The invention relates to an extrusion head (10) for a blow molding machine for producing two-layered hollow plastic bodies, including one or more extruders, connected to the extrusion head housing (12), for supply of molten plastic melt. In particular when using different plastic materials of different viscosities, it is very important to create for both materials substantially the same rheological flow conditions when distributed across the circumference to form a tubular parison. This is attained in accordance with the invention by making the ejector piston of two concentric cylindrical sleeves which define between them an annular gap in which the two spiral-channel distributor elements are located in opposite disposition inside on the inner surface of the outer cylindrical sleeve and outside on the outer surface of the inner cylindrical sleeve, so that the circumferentially distributed plastic materials of both distributor elements exit at the lower end of the annular gap approximately centrally from the ejector piston into the storage space of the extrusion head.

17 Claims, 3 Drawing Sheets

ND OF THE INVENTION

The present invention relates to an extrusion head for a blow molding machine for producing multi-layered hollow plastic bodies, with one or more extruders, attached to the extrusion head housing, for feeding molten plastic melt into the extrusion head, with a central torpedo, and at least one distributor element in concentric surrounding relationship to the torpedo for distribution of the plastic melt(s) across the circumference and feeding in an annular storage space which terminates in an annular outlet nozzle through which the plastic melt can issue.

Extrusion heads (=storage heads or accumulator heads) for blow molding machines are generally known.

U.S. Pat. No. 5,256,051 (Mauser) shows in FIG. 1 an extrusion head with two concentric spiral-channel distributor sleeves. The outer spiral-channel distributor is additionally covered by a further cylindrical sleeve. All three sleeves form the ejector piston which is configured for displacement in an axial direction and expels the accumulated plastic material from the storage space through the lower ring nozzle. In this extrusion head, both plastic streams are distributed in a disadvantageous way across the circumference via diameters of comparably very different sizes so that a wide construction of the extrusion head is required with the additional cover sleeve.

SUMMARY OF THE INVENTION

It is an object of the present invention to provide a novel extrusion head for a blow molding machine for producing two-layered hollow plastic bodies, in particular of large volume, which has rheologically substantially same flow conditions for all plastic particles during supply and circumferential distribution of the different molten plastic melts to the distributor elements, and in the distributor elements themselves, while at the same time realizing an improved overlap and circumferential distribution of the melt streams in the distributor element and a trouble-free homogenization in the storage space at simultaneous increase of the throughput power and production speed of the blow molding machine. Hereby, the structural height and the dimension of the diameters should be kept as small as possible.

According to the invention, this object is attained by providing two distributor elements in confronting relationship in an annular gap inside on the inner surface of an outer cylindrical sleeve and outside on the outer surface of an inner cylindrical sleeve centrally within the ejector piston, with the circumferentially distributed plastic material of both distributor elements exiting at the lower end of the ejector piston. This advantageous construction results in an extrusion head of slightest diameter and short structural height while realizing great throughput power.

According to a configuration of the invention, a comparably thin cylindrical separation sleeve is arranged approximately centrally within the annular gap so that both distributor elements are separated functionally but yet are disposed closely next to one another in a spatially very tight or coaxial manner. Thus, both circumferentially distributed plastic streams exit at the lower end of the annular gap from the ejector piston into the storage space at nearly same diameters—at same rheological flow conditions.

In accordance with a further advantageous configuration, the distributor elements are designed as cylindrical spiral-channel distributors arranged on the outer wall of the inner tubular piece and on the inner wall of the outer tubular piece. Hereby, the spiral-channel distributors have each at least four or more spiral channels spaced evenly across the circumference, whereby the depth of the spiral channels steadily decreases in flow direction with increasing length of the spiral channels, with the spiral channels being fed individually with molten plastic melt from atop of the ejector piston.

The particular configurations of the extrusion head according to the invention with cylindrical circumferential distributors have the following features and advantages:

- the distributor elements arranged on the outer wall and inner wall of both tubular pieces may each be configured as ring-channel distributors, hanger-type distributors, heart-shaped distributors, spiral-channel distributors or as suitable combination thereof,
- the distributor elements are arranged within the axially movable ejector piston formed of two concentric tubular pieces,
- in a configuration as spiral-channel distributor, each individual distributor has at least four or more spiral neighboring channels spaced evenly across the circumference,
- the depth of the spiral channels steadily decreases in flow direction with increasing length of the spiral channels,
- the individual spiral channels of each of the distributors are supplied or fed from above individually or separately within the ejector piston with partial streams of molten plastic melt from the main plastic melt of the connected extruder,
- for all plastic particles in the respective partial plastic streams of both cylindrical circumferential distributors, the flow conditions are rheologically the same to a greatest possible degree, thereby eliminating or evening out the adverse memory effect of the plastic materials,
- the extended separation sleeve projecting into the storage space and disposed between the distributor elements prevents both melt streams from adversely influencing one another,
- the displacement body at the lower free end of the separation sleeve attains in the lowermost position of the ejector piston a targeted material conduction while completely flushing the edge material when carrying out a material change and/or color change.

BRIEF DESCRIPTION OF THE DRAWING

The invention will now be described and explained in more detail with reference to schematic illustrations of the drawing, in which.

DETAILED DESCRIPTION OF PREFERRED EMBODIMENTS

Figure 1:
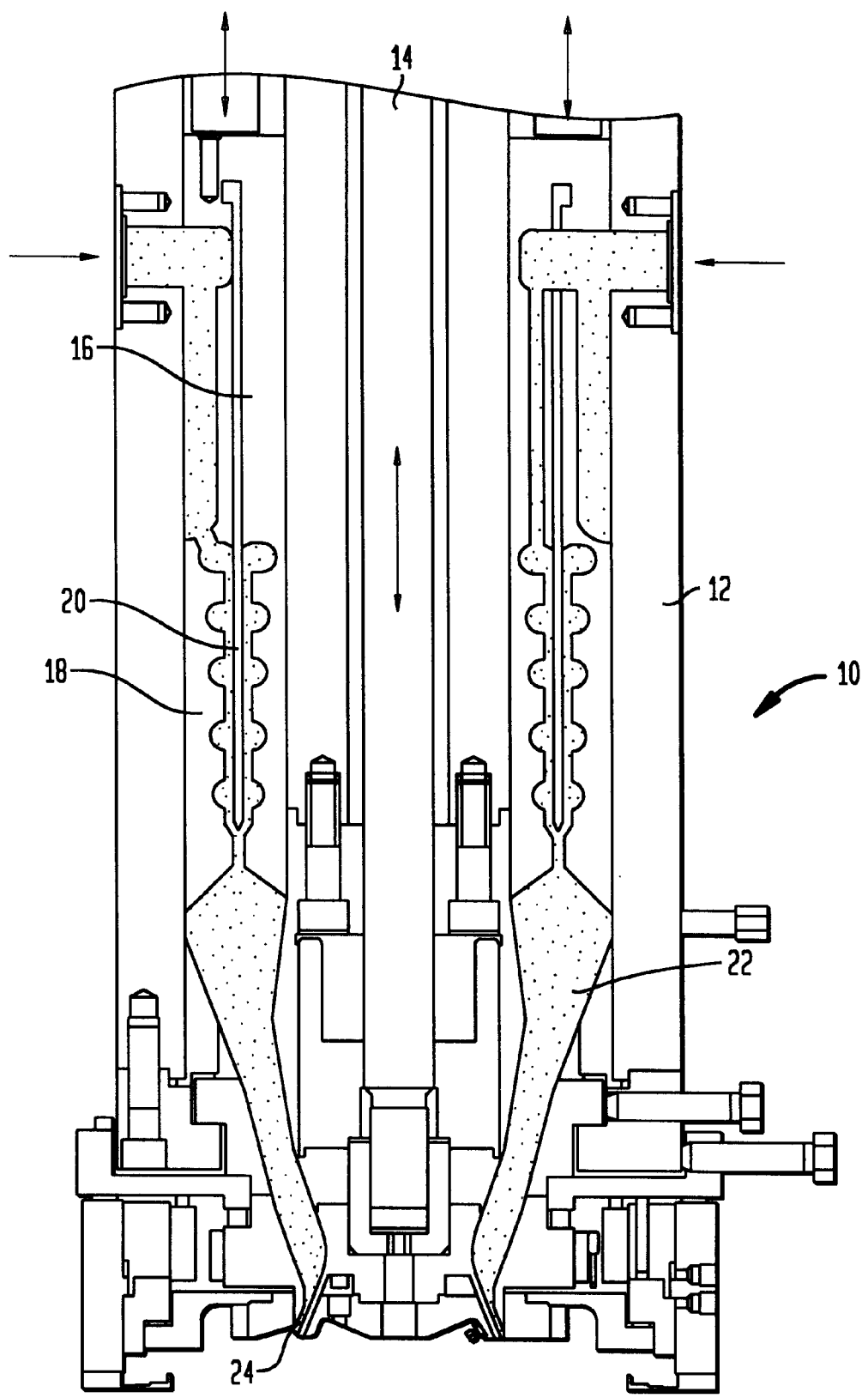
FIG. 1 shows a longitudinal section of an extrusion head according to the invention.

Reference numeral 10 denotes in FIG. 1 an extrusion head (=storage head) with an ejector piston axially movable in the housing 12, for a discontinuous operation.

The movable ejector piston surrounds a central torpedo 14 in the housing 12 of the extrusion head 10. The torpedo 14 is also supported for axial displacement for adjusting the gap width of the lower outlet nozzle 24. The flowing molten plastic material streams to be processed are received from the extruders (not shown in more detail) and fed at the top from the side (see arrows) into the housing 12.

In this exemplified embodiment, the ejector piston is made of two concentric tubular pieces 16 and 18. The plastic material streams are each conducted into the ejector piston via a longitudinal groove—for compensation of the piston stroke.

Provided on each of the outer surface of the inner tubular piece 16 and the inner surface of the outer tubular piece 18 is a spiral-channel distributor for distributing the incoming plastic melts across the circumference. The spiral-channel distributors have each at least four or more spiral channels spaced evenly across the circumference. The depth of the spiral channels steadily decreases in flow direction with increasing length of the spiral channels, with the spiral channels being fed individually with molten plastic melt at the top of the ejector piston.

To prevent twisting of the tube when the tubular parison is expelled, it is very important to configure the coils of both spiral-channel distributors in opposite direction to one another.

Inserted in the gap, formed between both tubular pieces 16, 18 or between both spiral-channel distributors, is a comparably thin cylindrical separation sleeve 20 which separates both circumferentially distributed melt streams within the ejector piston from one another. Both melt streams are united at the end of the separation sleeve 20 to form a two-layer strand in the storage space 22 of the extrusion head 10, positioned underneath the ejector piston. The comparably wide storage space 22 realizes during the calm phase of the plastic material (discontinuous operation) a relaxation and an internal stress decrease of the plastic material, thereby significantly reducing the adverse impact of the memory effect (tendency to swell again into the previous shape) of the plastic material. At its lower end, the storage space 22 terminates in the adjustable outlet nozzle 24 through which the plastic material is expelled as tubular parison between the open blow-mold halves of a blow molding machine.

Figure 2:
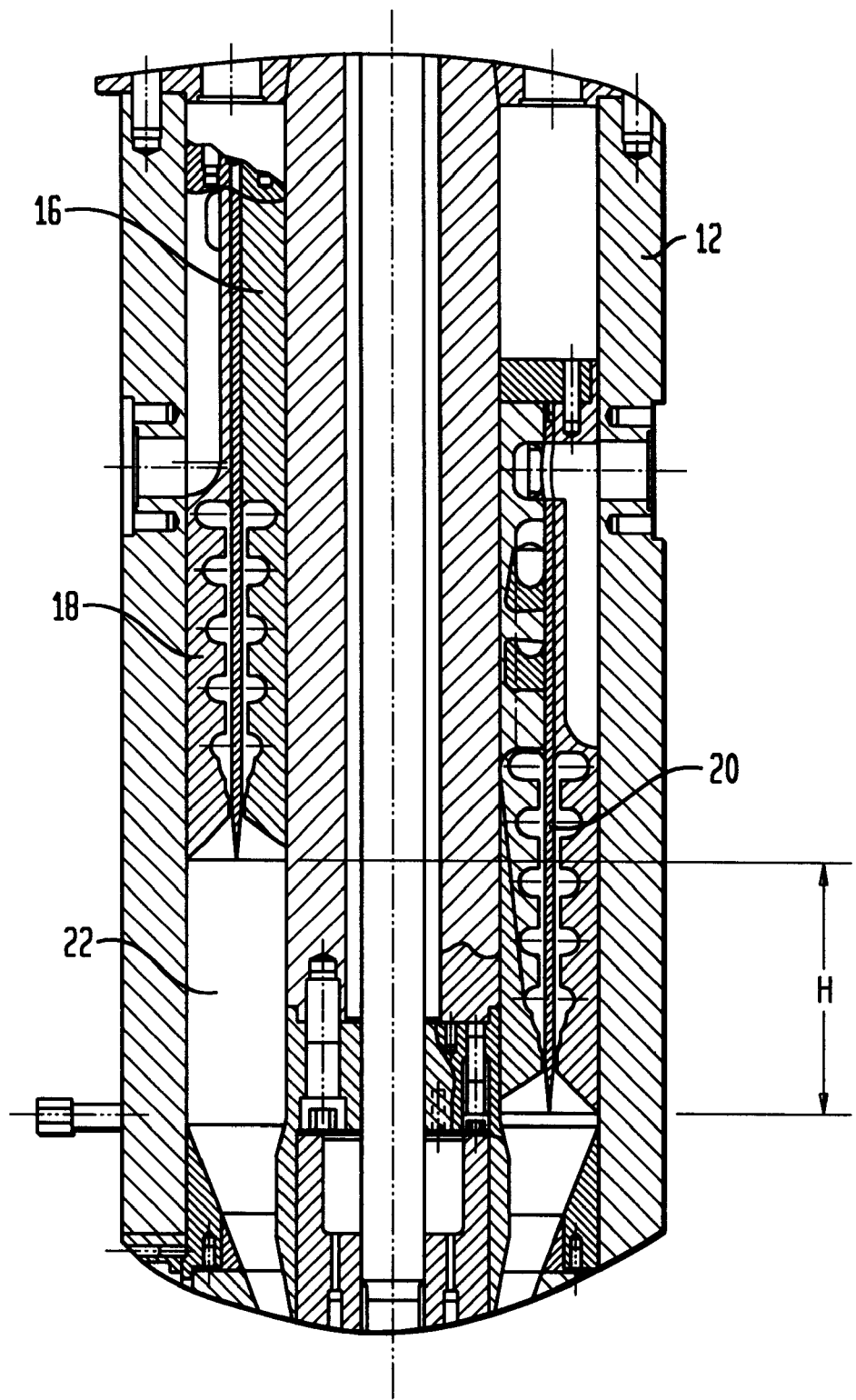
FIG. 2 shows a partially sectional view of a modified embodiment.

In FIG. 2, the ejector piston is shown on the left hand side of the drawing in its uppermost position, and on the right hand side of the drawing in its lowermost position. H designates the length of the piston stroke. In this representation, the separation sleeve 20 is extended and projects through the forward gap of the ejector piston by a short portion into the storage space. A uniting of both plastic streams occurs therefore only in the storage space. This is especially of importance when two different materials with different viscosities or melt index (MFI) are processed in order to prevent adverse mutual influences during the circumferential distribution. The viscous material would displace the liquid material. This could occur, for example, when providing on the inside an A-material (e.g. Lupolen 4261 A), which is resistant to stress cracking and has a high resistance to aggressive chemical liquids such as, e.g., peracetic acid, and on the outside a stiff Z-material (e.g. Lupolen 5261 Z) with high strength values, to form a two-layer stand for processing to high-grade L-ring drums. Even with such problematic materials, an entirely concentric equal material distribution is realized in the two layers of the tube and finished product, unlike e.g. with a conventional heart-shaped dual distributor.

In a 25 liters storage head, the separation sleeve 20 has, for example, a mean diameter of about 315 mm and a wall strength (thickness) of 10 mm.

Figure 3:
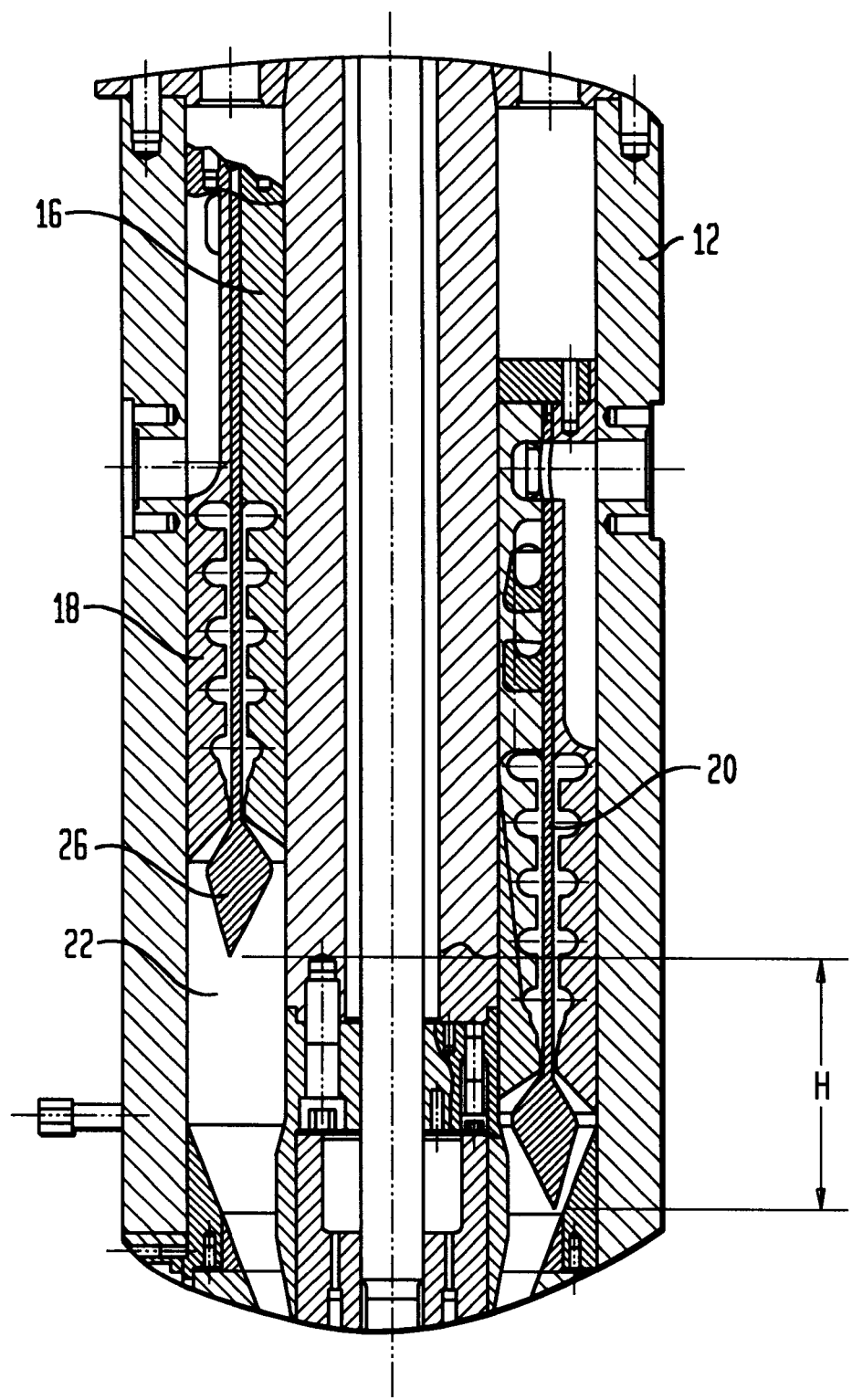
FIG. 3 shows a partially sectional view of another modified embodiment.

FIG. 3 shows another modified embodiment of the extrusion head 10 according to the invention. Formed and positioned at the free lower end of the separation sleeve 20 is a displacement body 26 which projects below the ejector piston into the storage space 22. The displacement body 26 is hereby matched to the contour of the lower end of the ejector piston and the area of the lower conical storage space (22), and has a rhomboidal or onion-shaped configuration. Through this constructively simple measure, it is attained that in the lowermost position of the ejector piston during material change and/or color change of the used plastic material for production of another hollow plastic body, a complete flushing of the previously used material is possible in a shortest time through targeted material conduction in the marginal zones of the lower storage space.

The extrusion head according to the invention can be advantageously mounted in existing blow molding machines at the position of a conventional storage head through simple exchange. In this way, a relatively small investment results in an effective increase of performance of the blow molding machine.

An essential advantage of the extrusion head according to the invention is, furthermore, the fact that the used sleeves can be exchanged and their length and shape can be suited to the main material being processed to attain superior processing results in highest quantities.

What is claimed is:

1. Extrusion head for a blow molding machine for producing multi-layered hollow plastic bodies, including one or more extruders, attached to a housing (12) of an extrusion head, for feeding molten plastic melt into the extrusion head (10), a central torpedo (14), and two spiral-channel distributor elements for distribution of the plastic melt(s) across the circumference and feeding into an annular storage space (22) which terminates in an annular outlet nozzle (24) through which the plastic melts are expelled by means of an axially movable ejector piston disposed in concentric surrounding relationship to the torpedo (14), wherein the ejector piston is accommodated in the housing and includes an outer cylindrical sleeve (18) having an inner surface configured to form a first one of the spiral channel distributor elements, and an inner cylindrical sleeve (16) having an outer surface configured to form a second one of the spiral-channel distributor elements in confronting relationship to the first distributor element in a single annular gap, which is defined between the outer cylindrical sleeve (18) and the inner cylindrical sleeve (16) approximately centrally in the ejector piston, with the circumferentially distributed plastic melt of both distributor elements exiting at the lower end of the annular gap from the ejector piston.

2. Extrusion head according to claim 1, wherein a thin-walled cylindrical separation sleeve (20) is arranged approximately centrally within the annular gap, thereby separating both distributor elements, so that circumferentially distributed streams of plastic melt exit at the lower end of the annular gap from the ejector piston into the storage space at substantially same diameters.

3. Extrusion head according to claim 2, wherein the separation sleeve (20) is extended by a portion beyond an end of the ejector piston and projects into the storage space (22).

4. Extrusion head according to claim 2, wherein there exists at a free lower end of the separation sleeve (20) a displacement body (26) which projects into the storage space (22) below the ejector piston.

5. Extrusion head according to claim 4, wherein the displacement body (26) has a rhomboidal or onion-shaped cross sectional configuration.

6. Extrusion head according to claim 1, wherein the distributor elements are configured as cylindrical spiral-channel distributors arranged on the outer surface of the inner sleeve (16) and the inner surface of the outer sleeve (18).

7. Extrusion head according to claim 6, wherein each of the spiral-channel distributors has at least two spiral channels spaced evenly across the circumference, whereby a depth of the spiral channels steadily decreases in flow direction with increasing length of the spiral channels, with the spiral channels receiving from a housing top separate streams of molten plastic melt.

8. Extrusion head according to claim 6, wherein the spiral-channel distributors have coils wrapped circumferentially around the sleeves in opposite direction to one another.

9. An extrusion head for a blow molding machine, comprising:

a housing receiving at least two streams of plastic melt, said housing having a storage space;

a torpedo movably fitted in the housing for controlling a gap width of an outlet nozzle; and a melt distributing and ejection unit received in the housing in surrounding relationship to the torpedo, said melt distributing and ejection unit including an inner cylindrical sleeve and an outer cylindrical sleeve in concentric surrounding relationship at formation of a single annular gap therebetween, said inner sleeve having an outer surface formed with a spiral-channel distributor element circumferentially distributing one of the streams of plastic melt, and said outer sleeve having an inner surface formed with a spiral-channel distributor element circumferentially distributing the other one of the streams of plastic melt, said distributor elements of the inner and outer sleeves being disposed in confronting relationship in the annular gap, with the streams of plastic melt exiting the melt distributing and ejection unit at a lower end of the annular gap into the storage space.

10. The extrusion head of claim 9, wherein the melt distributing and ejection unit includes a cylindrical separation sleeve arranged in the annular gap to separate the distributor elements from one another.

11. The extrusion head of claim 9, wherein the separation sleeve is configured to allow the streams of plastic melt to exit together at the lower end of the annular gap into the storage space.

12. The extrusion head of claim 10, wherein the separation sleeve has a length sufficient to project into the storage space.

13. The extrusion head of claim 10, wherein the separation sleeve has a lower end formed with a displacement body which projects into the storage space.

14. The extrusion head of claim 13, wherein the displacement body has a cross sectional configuration selected from the group consisting of rhomboidal and onion-shaped.

15. The extrusion head of claim 10, wherein each of the distributor elements is configured as a cylindrical spiral-channel distributor.

16. The extrusion head of claim 15, wherein the spiral-channel distributor has at least two spiral channels spaced evenly across the circumference and steadily decreasing in depth in flow direction with increasing length of the spiral channels, one of the streams of plastic melt being introduced on top of the housing into the spiral channels of one of the distributor elements, and the other one of the streams of plastic melt being introduced on top of the housing into the spiral channels of the other one of the distributor elements.

17. The extrusion head of claim 15, wherein the spiral-channel distributor of one of the distributor elements and the spiral-channel distributor of the other one of the distributor elements have coils wrapped circumferentially around the sleeves in opposite direction to one another.

* * * * *